United States Patent [19]

Widell

[11] 4,080,195

[45] Mar. 21, 1978

[54] MELT REDUCTION OF IRON ORE

[75] Inventor: Björn Widell, Vesteras, Sweden

[73] Assignee: ASEA Aktiebolag, Vesteras, Sweden

[21] Appl. No.: 778,443

[22] Filed: Mar. 17, 1977

Related U.S. Application Data

[63] Continuation-in-part of Ser. No. 332,656, Feb. 15, 1973, abandoned.

[30] Foreign Application Priority Data

Feb. 24, 1972 Sweden .............................. 2272/72

[51] Int. Cl.$^2$ .............................................. C21C 5/52
[52] U.S. Cl. ......................................................... 75/11
[58] Field of Search ........................................ 75/10–12

[56] References Cited

U.S. PATENT DOCUMENTS 3,827,877  8/1974  Pantke ...................................... 75/11

*Primary Examiner*—P. D. Rosenberg
*Attorney, Agent, or Firm*—Kenyon & Kenyon, Reilly, Carr & Chapin

[57] ABSTRACT

A method for reducing finely divided iron ore supplied to a ferrous melt, comprises inductively heating part of the melt at a heating rate higher than any heating of the balance of the melt so as to form in the melt an electrically heated part of the melt putting heat into the balance of the melt. The ore is injected substantially directly into this electrically heated part of the melt while the melt is supplied with carbonaceous material. The heating rate is maintained to keep the electrically heated part of the melt at a temperature sustaining the endothermic reaction between the iron ore and the carbonaceous material as required to reduce the ore to iron which then becomes a part of the melt.

8 Claims, 3 Drawing Figures

MELT REDUCTION OF IRON ORE

BACKGROUND OF THE INVENTION

This is a continuation-in-part of application Ser. No. 332,656 filed Feb. 15, 1973 now abandoned.

When finely divided iron ore and carbonaceous material are supplied to an iron melt, the iron oxide of the ore and the carbon of the carbonaceous material can be made to react so that the ore is reduced to iron which is added to the melt and carbon-oxide gases are produced, if an adequately high reaction temperature can be maintained. The reaction is endothermic and it is undesirable to maintain the entire iron melt at a temperature as high as that required for the iron oxide and carbon to react. The iron ore may be in the form of iron ore concentrate.

It has already been proposed to float a glowing coke bed on the iron melt and to feed the finely divided or granular iron ore downwardly to the melt, to maintain in this way at the melt top level a temperature adequate for the reaction between the iron oxide and the carbon supplied by the coke. Another proposal has been to inject the ore and adequate pulverized coal or oil to the iron melt so as to in this way produce enough combustible gas above the melt for burning to supply the required heat to the top of the melt. Still another proposal has been to heat the iron melt by an electric arc and to feed the ore and reducing agent to the melt beneath the arc.

However, it is desirable to avoid the great temperature gradients in the melt involved by the above proposals, while obtaining a good production of iron for a given quantity of iron melt.

SUMMARY OF THE INVENTION

The present invention provides a method for reducing the finely divided or granular iron ore, preferably in the form of iron ore concentrate, supplied to the iron melt, this method comprising inductively heating a part of the melt at a heating rate higher than any heating of the balance of the melt so as to form in the melt an electrically heated part of the melt putting heat into the balance of the melt, and injecting substantially directly into this electrically heated part of the melt the iron ore while the melt is supplied with the carbonaceous material. That heating rate is maintained adequately to keep the electrically heated part of the melt at a temperature sustaining the endothermic reaction between the iron ore and the carbonaceous material. The carbonaceous material is preferably in fluent form, such as powdered or granular coke, and is preferably also injected into that electrically heated part of the melt.

Two types of furnaces are available for practicing the above method.

One type is the induction crucible furnace consisting essentially of a crucible surrounded by an electric induction coil fed with AC current and producing an electric field in an iron melt in the crucible, this field inherently being in the form of a torous electrically heating a part of the melt between the top and bottom of the coil at and adjacent to the axis of the coil. The inductive heating of this part of that melt is at a heating rate higher than any heating of the balance of the melt and this forms in the melt the electrically heated part of the melt putting heat into the balance of the melt by conduction and usually stirring of the melt.

Therefore, by using such a crucible induction furnace, the finely divided or granular iron ore can be forcibly injected into that electrically heated part while the furnace's induction coil is powered to maintain that part of the melt at a temperature sustaining the endothermic reaction between the iron ore and the carbonaceous material. Preferably a fluent carbonaceous material is used, such as pulverized coal, bottle gas or oil, and is also injected into that electrically heated part of the iron melt to supply the necessary carbon for reacting with the iron oxide of the ore. The ore and carbonaceous material, as a mixture, can be injected into the electrically heated part of the melt by injection via a stream of pressurized gas in such a way that mixing is achieved in that part together with incidental stirring of the melt. This hastens the reduction of the oxide and contributes to the homogenization of the melt, both with regard to the temperature of the melt and its ingredients. The iron melt may be kept highly carbonaceous by other means.

In this portion of the electrical field induced by the induction coil of the induction crucible furnace, located in the iron melt on and around the axis of the coil and between the coil's top and bottom ends, heat is put into the melt at a rate faster than anywhere else. The part of the melt at this location continuously puts heat into the balance of the melt, normally added by inductive stirring of the melt which transfers this part of the melt to the balance of the melt. Because the endothermic reaction between the iron oxides and carbon occurs in this part, there is this additional abstraction of heat from this part with the necessary heat input provided inherently by the characteristic field created by the furnace's induction coil. Great temperature gradients on the part of the melt can, therefore, be avoided while a good production of iron is obtained.

The other type is the channel-type induction furnace. In this type a crucible for containing the iron melt is provided with at least one channel-type inductor, the melt filling the channel of the inductor so as to electrically heat the melt in the channel. By the well-known pinch effect, this electrically heated part is displaced into the balance of the melt within the crucible, with this displaced electrically heated part putting heat into the balance of the melt by conduction and stirring obtained by the flow induced in the channel. It is into this electrically heated part of the melt that the finely divided or granular or powdered ore preferably mixed with the fluent carbonaceous material is injected in accordance with the present invention. The stirring effect of the pressurized gas carrier and the inductor's pinch effect contribute to a thorough mixing of the reacting materials. The endothermic reaction removes heat from this electrically heated part of the melt which is continuously displaced from the inductor's channel into the melt and this, possibly but not necessarily, aided by inductively stirring the melt above the channel-type inductor by means of an external induction stirring coil, contribute to the avoidance of great temperature gradients on the part of the melt in the furnace crucible while a good production of iron is obtained.

As in the prior proposals, reduced iron and possibly slag must be removed from time to time or continuously, in the case of any furnace used for the melt reduction of iron ore. In the case of the present invention, a heavy slag layer can be provided with additional heat, other than is electrically provided, to keep the slag viscosity low enough to permit the escape of gases from within the iron melt where the reaction is occurring. Adequate inductive melt stirring can avoid the formation of a gas-impervious slag layer. Lime or fluorspar can be added to reduce slag viscosity.

BRIEF DESCRIPTION OF THE DRAWINGS

The accompanying drawings are entirely schematic in nature and are provided for the purpose of illustrating the various phases of the method of the present invention. In these drawings the figures are as follows.

DETAILED DESCRIPTION OF THE INVENTION

Figure 1:
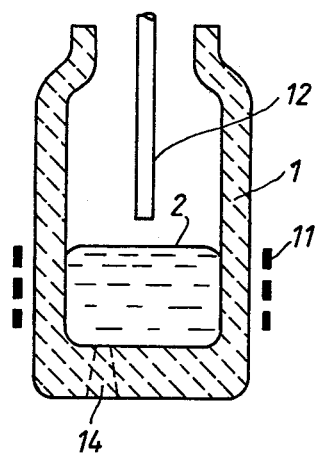
FIG. 1 in vertical section shows how an induction crucible furnace may be used.

In the above drawings, FIG. 1 shows an induction crucible furnace comprising the crucible 1 into which in the practice of this invention on the iron melt 2 is tapped. Conventionally the crucible 1 is cylindrical and is surrounded substantially concentrically by the induction coil 11 which is powered by AC to inductively heat the melt 2. In the conventional way the electrical field induced in the melt 2 inherently provides the maximum heating rate at and around the axis of the coil 11 at a location between the top and bottom of the coil 11. The electric power supplied to the coil 11 may be a single-phase low or high frequency current and possibly the connections with the coil may be adapted to polyphase current in order to inductively stir the melt 2 while heating. Such inductive stirring is practiced to stir into the balance of the melt the part of the melt inductively heated at a higher rate than the balance of the melt.

The finely divided ore, preferably in the form of ore concentrate, and reducing agent such as pulverized coal, bottled gas or oil are supplied from above via the supply pipe 12. Additional supply pipes can be used and one or more of them may extend into the melt from below the melt. However, all of these additives, the ore concentrate and reducing agent, are supplied to the melt in what can be referred aptly to as the electrically heated part of the melt in the furnace, in the sense that it is at the central location between the top and bottom of the induction coil 11 that the maximum and most effective heat input to the melt is provided.

The supply of ore concentrate and reducing agent supplied through the pipe 12 can be made by injection towards the melt by means of a pressurized stream of gas. The stream carrying these ingredients can move at sufficient velocity to drive the ingredients down into the melt and into the part of the melt receiving the maximum heat input from the induced currents, this providing mixing of the ingredients and stirring of the melt which hasten the reduction of the oxide and contributes to the homogenization of the melt, both with regard to the temperature of the melt and the ingredients concentrated in the part of the melt receiving the maximum heat input. In addition, the melt can be inductively stirred by powering the induction windings with polyphase current in the conventional manner used to effect both heating and inductive stirring of the melt in the furnace. It is possible to design the furnace with one or more porous plugs or tubes 14 for injecting gas or a liquid which if reducing in character may permit the feed to the pipe 12 to be the ore component only.

Figure 2:
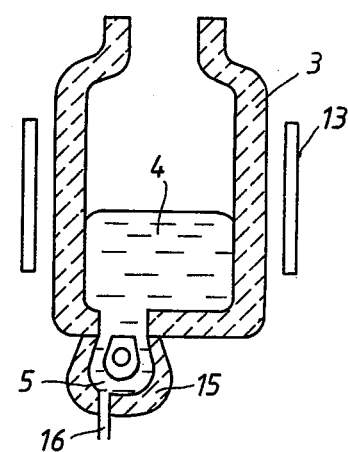
FIG. 2 in vertical section shows the use of a channel-type induction furnace.

FIG. 2 shows a channel-type induction furnace such as conventionally comprises a crucible 3 having a hole in its bottom and to which a channel-type inductor 15 is fixed customarily in a removable manner. The iron melt tapped into this furnace is shown at 4, a part of this melt filling the channel 5 of the inductor 15.

As is well known, when the inductor 15 is electrically powered, the part of the melt in the channel 5 is inductively electrically heated and due to the pinch effect is constantly displaced from this channel into the melt 4 with the melt above the channel keeping the latter continuously filled with the melt. This electrically heated part of the melt in the channel 5 while in the channel and adjacently beyond the inductor's channel, represents the only part of the melt 4 that is electrically heated and it is into this part that according to the present invention that the finely divided or granular and, therefore, fluent iron ore should be introduced. It is this part that provides the heat for sustaining the desired endothermic reaction while at the same time putting heat into the balance of the melt. The reaction can occur in the channel and/or in the electrically heated part of the melt pinched or displaced into the balance of the melt from the channel 5.

It follows that in the case of the channel-type inductor furnace, it is also possible to avoid great temperature gradients in the melt while obtaining a good production of iron. The electrically heated part of the melt that would normally have a temperature substantially higher than the balance of the melt, is not only giving off its heat to the balance by conduction and stirring but is supplying heat for the endothermic reaction occurring between the iron ore and reducing agent. In addition, the pinch effect of the inductor 15 stirs the melt, even further stirring being possible by using a conventional induction stirrer indicated at 13 and conventionally comprising a stirrer coil surrounding the crucible and appropriately powered with low frequency polyphase AC current.

In FIG. 2 the ingredients to be reacted are shown as injected at 16 directly into the electrically heated part of the melt being inductively driven through the channel 5 and into the melt 4. Preferably both ore concentrate and reducing agent are injected into the electrically heated part of the melt in any event.

A pressurized gas stream may be used to carry the ingredients for injection into the melt.

Figure 3:
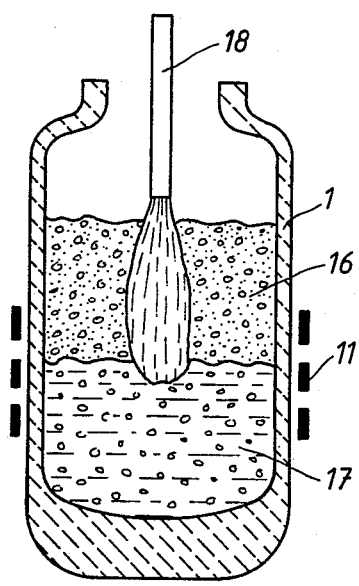
FIG. 3 in vertical section shows an induction crucible furnace exemplifying the provision of additional heating other than electrical of slag floating on the iron melt.

In FIG. 3 a furnace like the one described in FIG. 1 is shown, the iron melt being shown at 17 and in this case with a thick layer of slag 16 floating on top of the melt 17. Such a slag is conductive electrically and is therefore inductively heated by the induction coil 11 which as the melt level is shown in FIG. 3, results in the part which is electrically heated at a greater rate than the balance, being located centrally within the furnace about at the interface between the slag 16 and melt 17.

When a mixture of finely divided ore and fluent carbonaceous material is injected into that part of the furnace receiving the maximum inductive heating, the injection being via either the pipe 12 in FIG. 1 or 18 in FIG. 3, there is the possibility that the slag layer shown at 16 might act as a blanket through which the gas developed in the melt 2 or 17 could not pass.

However, the slag, such as is shown at 16 in FIG. 3, can by heating be given such a low viscosity that the gas developed in the iron melt due to the reaction occurring internally within the melt, can pass through such a layer of slag. Such heating can be effected in addition to the electrical heating of the slag 16 by the field of the induction coil 11, by additionally supplying the pipe 18 with fuel and oxygen. The fuel may be in excess of the reducing agent, such as pulverized coal or oil providing the excess of reducing agent. The oxygen necessary for combustion can be supplied together with the fuel or separately through cooled tubes or nozzles (not shown) in the vessel, cooled by means of argon or bottled gas. In such ways combustion above the slag can be used to heat the slag layer indicated at 16. This heavy slag layer is between such heating and the melt 17.

Intensive stirring of the melt in the furnace may prevent the formation of a slag layer preventing escape of gases from the melt. Such stirring may be effected as previously indicated. Also, the viscosity of the slag can be reduced by additions such as lime or fluorspar.

In general, ordinary metallurgical furnace design and practices may be used in carrying out this new method.

What is claimed is:

1. A method for reducing finely divided iron ore, comprising inductively heating a ferrous melt and injecting the iron ore into the portion of said melt where the maximum rate of heating the melt is obtained from the inductive heating and while supplying the melt with carbonaceous material.

2. The method of claim 1 in which said carbonaceous material is supplied to said melt by being in fluent form and injected into said portion.

3. The method of claim 1 in which said injecting is via a gas stream in which said finely divided iron ore is mixed and carried into said melt to said portion of the melt and which stream mixes the iron ore with said portion and stirs the melt to hasten the iron ore's reduction and stir the melt to promote homogenization of the melt both as to its temperature and its ingredients.

4. The method of claim 1 in which said melt is inductively stirred during said injecting.

5. The method of claim 1 in which layer of slag is formed on top of said melt during said injecting and said slag layer is heated to a temperature giving the slag such a low viscosity that gas developed in the melt can pass through this slag layer.

6. The method of claim 1 in which said melt is contained in a crucible surrounded by an electric induction coil fed with AC current and inductively forming said portion beneath the top of the coil and above the bottom of the coil and within the melt.

7. The method of claim 1 in which said melt is contained in a channel-type induction furnace having a channel-type inductor with a channel and from which channel under the influence of pinch-effect said portion is formed in the melt.

8. The method of claim 7 in which said injection of said iron ore is into the channel of said channel-type inductor.

* * * * *